Figure 1:
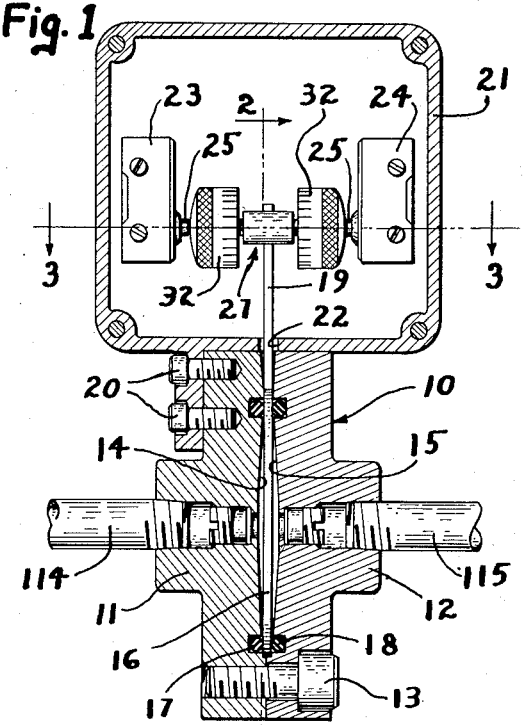

Dec. 13, 1960

N. C. HUNT 2,964,062

PRESSURE RESPONSIVE DEVICE

Filed Feb. 18, 1957

3 Sheets-Sheet 1

INVENTOR.
Nathan C. Hunt
BY
Attorney

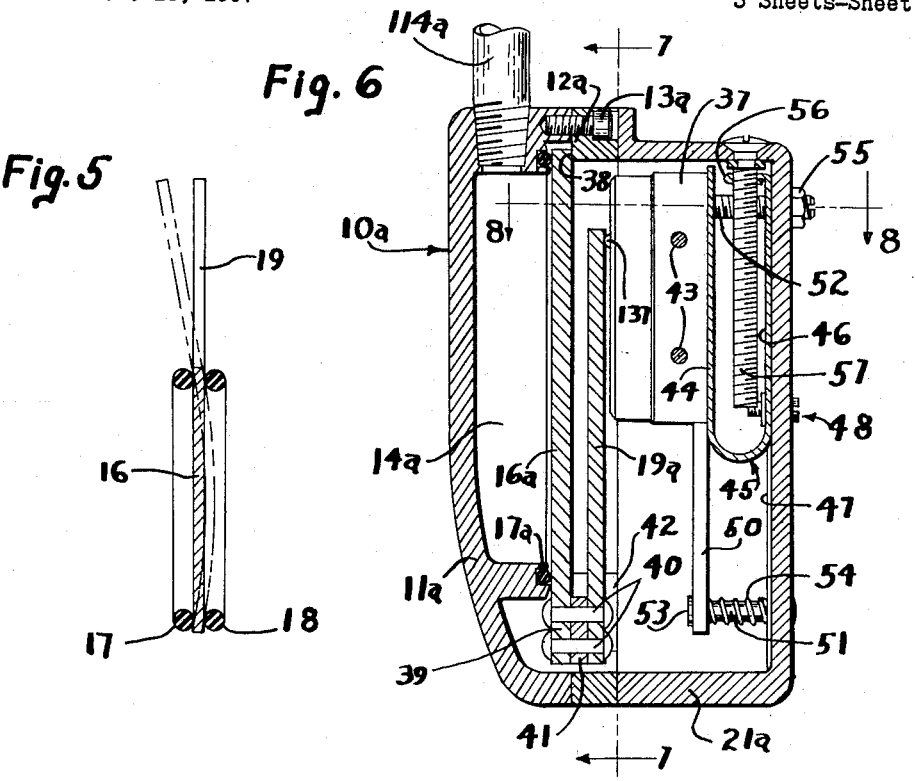

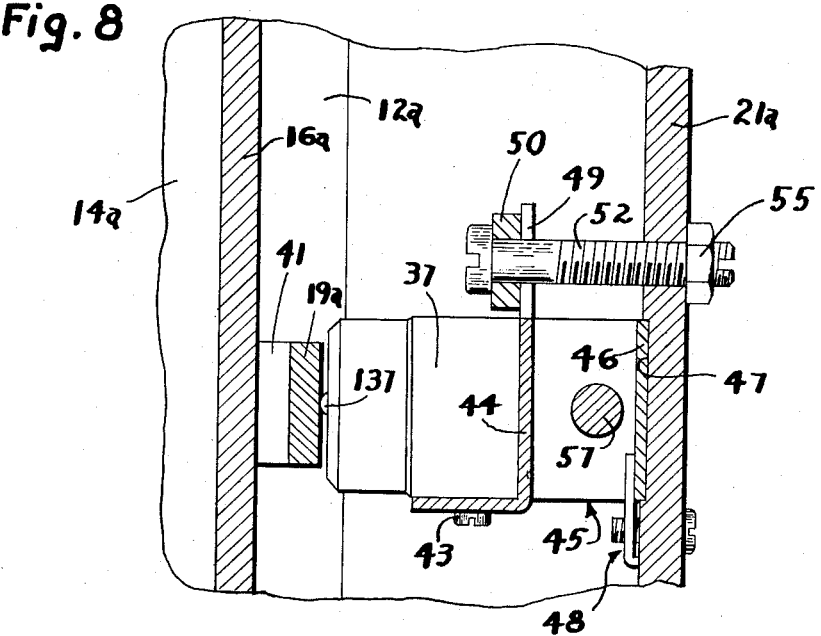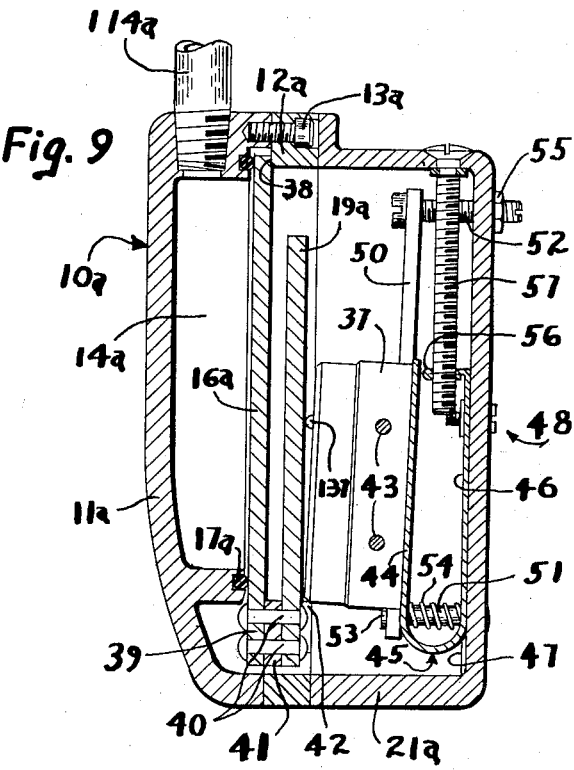

United States Patent Office 2,964,062
Patented Dec. 13, 1960

2,964,062

PRESSURE RESPONSIVE DEVICE

Nathan C. Hunt, Salem, Ohio, assignor, by mesne assignments, to International Basic Economy Corporation, New York, N.Y., a corporation of New York Filed Feb. 18, 1957, Ser. No. 640,896

17 Claims. (Cl. 137—784)

The present invention relates to a fluid pressure responsive device, more particularly to a device having a disk member whose opposite sides are exposed to differential fluid pressure and which flexes under the influence of such differential pressure, and the principal object of the invention is to provide new and improved devices of such character.

While fluid pressure responsive devices of the general type herein disclosed have long been employed to actuate switches or like mechanisms, these prior art devices have had certain disadvantages. One disadvantage has been that the disk member, or diaphragm, even though made of metal, has been prone to rupture in service. This has resulted largely because in these prior art constructions, the diaphragm was necessarily thin in order to provide the requisite flexibility. Another disadvantage of prior art constructions has been that delicate mechanisms were frequently required to amplify diaphragm movement to a point whereby such movement was adequate to effect the desired operation of the switch or other device controlled by the diaphragm.

The present invention has neither of the aforesaid disadvantages of prior art devices. Other advantages of the present invention will become apparent from a study of the following description and from the drawings appended hereto.

Figure 2:
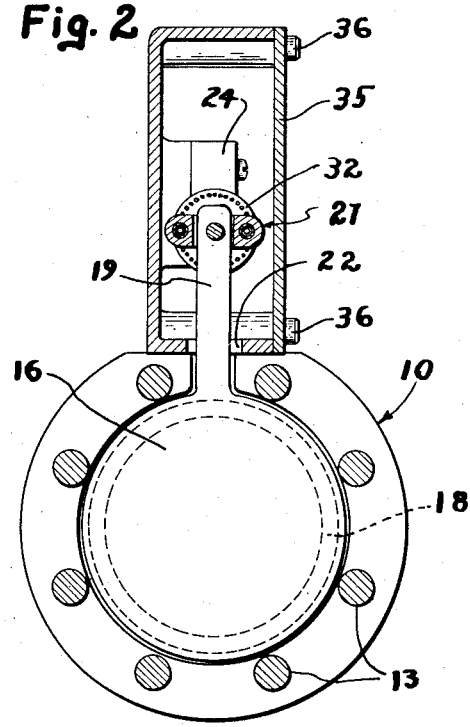
Figure 3:
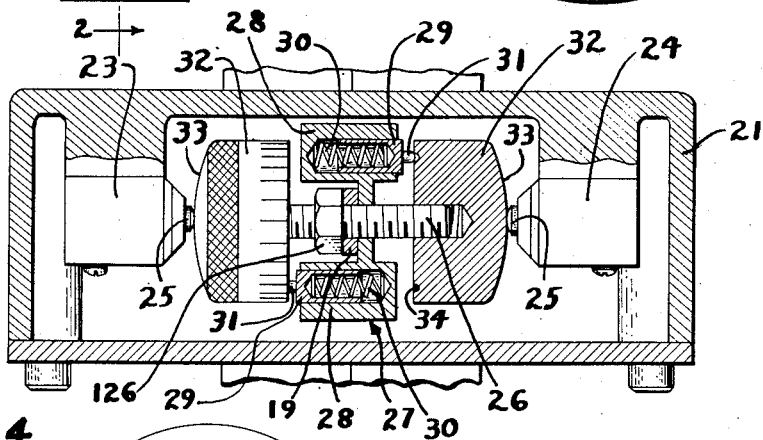
Figure 4:
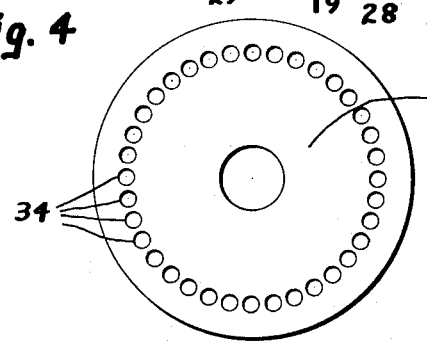

In the drawings accompanying this specification and forming a part of this application there are shown, for purpose of illustration, embodiments which the invention may assume, and in these drawings:

Figure 1 is a side elevational view, partially in section, of a preferred embodiment of the invention, Figure 2 is a sectional view generally corresponding to the line 2—2 of Figure 1, Figure 3 is an enlarged fragmentary sectional view generally corresponding to the line 3—3 of Figure 1, Figure 4 is an enlarged view of a detail, Figure 5 is an exaggerated, generally diagrammatic view of a detail, Figure 6 is a sectional view of another embodiment of the invention, Figure 7 is a sectional view generally corresponding to the line 7—7 of Figure 6, Figure 8 is an enlarged, fragmentary sectional view generally corresponding to the line 8—8 of Figure 6, and Figure 9 is a view similar to Figure 6 but with certain parts in a different adjusted relation.

In the embodiment shown in Figures 1 and 2, there is shown a housing 10 formed of two housing portions 11 and 12 secured together by suitable bolts 13. The adjoining faces of the housing portions are provided with respective recesses, one of which provides a chamber 14 and the other of which provides a chamber 15. As herein disclosed, the chambers are separated by a relatively thick metallic diaphragm, or disk 16. This disk, in the present embodiment and by way of illustration, is approximately four inches in diameter and one eighth of an inch in thickness.

Each housing portion 11, 12 is provided with an annular groove adjacent the periphery of disk 16 and seated in respective grooves for sealing engagement with respective adjoining faces of the disk are O rings 17, 18. It will be clear that the parts are so proportioned that when bolts 13 are tightened, the disk will be clamped between the O rings so as to seal the periphery of each chamber 14, 15. As will later appear, since the periphery of the disk is clamped between resilient O rings instead of between inflexible housing portions, the disk may flex despite its thickness. This follows because the resilient O rings permit a certain amount of movement of the periphery of the disk.

As best shown in Figures 1 and 2, disk 16 has a structurally integral tongue, or arm, 19 extending radially outwardly from its periphery. Each housing portion 11, 12 is notched to pass the arm, such notch permitting the arm to extend outwardly of the housing 10 and providing sufficient clearance whereby movement of the arm, as will later be disclosed, will not be impeded.

Secured to housing 10 by means of capscrews 20 is a casing 21 which is apertured at 22 to pass arm 19. In the presently disclosed embodiment, a pair of suitable switches 23, 24 are positioned within casing 21 in spaced-apart relation for actuation by movement of arm 19. These switches may be employed to control operation of, for example, pumps, warning devices, or other suitable apparatus and each switch has a protruding actuator button 25 which operates its internal switch mechanism.

The free end of arm 19 in the present embodiment is not directly engaged with switch actuators 25 but instead carries the following mechanism for a purpose to be disclosed. As best seen in Figure 3, the free end of arm 19 is apertured to pass an externally threaded stud member 26. Stud 26 is threaded through the intermediate portion of a saddle member 27 and a nut 126 is threaded on the stud to hold the latter, the saddle member 27, and the arm 19 firmly together. Saddle member 27 has enlargements 28 on each side of arm 19 and these enlargements provide oppositely facing bores for slidably receiving respective plungers 29. Each plunger is yieldably urged in a direction outwardly of its bore by a spring 30 and each plunger has an axially extending abutment 31 for a purpose to be seen.

Threaded on respective ends of stud 26 are caps 32 having rounded ends 33 for engagement with respective switch actuators 25. The end of each cap opposite rounded end 33 is provided with a plurality of recesses 34 (see Figure 4) spaced equidistant from each other and from the axis of the cap and such recesses are positioned to receive respective abutments 31 of respective plungers 29.

Since caps 32 are threaded on stud 26, each may be rotated along the stud to increase or decrease its spacing from arm 19 to thereby provide for actuation of the switches at various pressures as will later appear. Since the abutments 31 are resiliently urged into recesses 34 they will effectively prevent unintentional rotation of the caps; however, since recesses 34 are shallow, the caps may nevertheless be rotated to provide the aforementioned adjustment. During rotation of a cap 32, the abutment 31 with which it is engaged will be urged by its spring 30 into successive recesses until the cap has been rotated to its desired position whereupon the abutment will, by virtue of its being resiliently seated in a recess, hold the cap against undesirable rotation.

As best seen in Figure 2, a wall 35 of casing 21 is removably held in place by screws 36 to provide for ready access to the interior of the casing.

In the position of parts shown in Figure 1, and assuming that respective chambers 14, 15 are in communication with sources of fluid pressure through respective conduits 114, 115, the fluid pressures in chambers 14, 15 are substantially equal whereby disk 16 will be in the flat, unstressed position illustrated. If, for example, the fluid pressure in chamber 14 exceeds that of chamber 15, either by an increase in the pressure in chamber 14 or by a decrease in the pressure in chamber 15, disk 16 will be flexed from the position shown in full lines in Figure 5 to the dished position shown in phantom lines. As disk 16 flexes to its phantom line position, the portion thereof engaged with O ring 18 will tend to rock about the fulcrum provided by such O ring. This flexing movement of the disk will be substantially unimpeded since the disk is clamped between resilient O rings instead of between rigid housing surfaces as in many prior art constructions.

When disk 16 flexes to the dished configuration shown in phantom lines in Figure 5, arm 19 will be shifted to its phantom line position to actuate one or both of the switches 23, 24. It will be noted that because of the length of arm 19, its free end will move a distance several times greater than the distance that the disk itself moves during flexure. Arm 19, therefore, amplifies movement of the disk and makes the device much more sensitive to small differential fluid pressures in the respective chambers 14, 15. It will readily be apparent that when the pressure in chamber 15 exceeds that in chamber 14, disk 16 will be flexed in the opposite direction to thereupon move the free end of arm 19 in the opposite direction from that shown in Figure 5.

The embodiment illustrated in Figures 6 through 9 is similar in many respects to the embodiment heretofore disclosed; accordingly, similar parts are identified with the same reference characters but with the suffix "a" added. In this embodiment, housing 10a provides but one fluid chamber 14a on one side of disk 16a, the other side of the disk being exposed to atmospheric pressure. Since the right side of disk 16a (in the position of parts shown) is exposed only to atmospheric pressure, a switch 37 may conveniently be positioned adjacent this side of the disk in order to provide a more compact assembly. Furthermore, in this embodiment, since there is but one fluid chamber, only one O ring 17a is required to prevent escape of fluid, the disk 16a being clamped between a surface 38 of housing portion 12a and O ring 17a carried by housing portion 11a.

In order to provide for greater compactness, arm 19a of disk 16a does not extend radially outwardly of the disk as in the previously disclosed embodiment but instead extends diametrically of the disk from one edge thereof (see Figures 6 and 7). In this construction, disk 16a has a short tab 39 extending radially outwardly of its periphery and one end of arm 19a is rigidly secured to such tab by means of rivets 40 or the like. A spacer 41 is preferably interposed between the arm and the tab to space the arm away from the adjacent face of the disk and, as best shown in Figure 7, housing portion 12a is cut away at 42 to pass arm 19a and provide for free movement thereof.

Casing 21a is secured to housing portion 12a by suitable screws and, in this embodiment, casing 21a carries but a single switch 37 having an actuator button 137 engageable with arm 19a. For a purpose to be seen, switch 37 is adjustably mounted for movement not only toward and away from arm 19a but also for movement longitudinally of the arm. To provide for such adjustment, the following construction is presently employed.

As best seen in Figures 6 and 8, switch 37 is secured by screws 43 to one leg 44 of a U-shaped spring member 45. The other leg 46 of member 45 fits within and is slideable along a groove 47 formed in casing 21a. A clamp 48 holds leg 46 within groove 47 and at any desired position therealong. Leg 44 of spring member 45 has an ear 49 (see Figure 8) which bears against a bar 50, one end of which is apertured to pass and is supported by a stud 51 anchored in casing 21a and the other end of which is apertured to pass and is supported by a screw 52 threaded into the casing.

Stud 51 has a head 53 and bar 50 is urged to engagement with the head by means of a coil spring 54 carried by this stud. The other end of bar 50 is urged to engagement with the head of screw 52 by virtue of the resiliency of spring member 45 whose tab 49 bears against the bar. The end of screw 52 opposite its head is provided with a screwdriver slot and a nut 55 is threaded on the screw to lock the latter against unintentional rotation. As seen in Figure 6, the free end of leg 46 of member 45 has a transversely extending portion 56 through which is threaded a screw 57 rotatably carried by casing 21a.

It is to be understood that as screw 52 is rotated in one direction or the other, after first loosening locknut 55, switch 37 will be moved toward or away from arm 19a to thereby cause actuation of the switch by the arm at various fluid pressures in chamber 14a. As screw 57 is rotated, after first loosening clamp 48, switch 37 will be shifted longitudinally of arm 19a to thereby vary the sensitivity of the switch to changes in fluid pressure in chamber 14a by varying the effective length of arm 19a.

As illustrated in Figure 9, switch 37 has been shifted from its most sensitive position shown in Figure 6 to its least sensitive position. It has also been shifted away from arm 19a so that a greater pressure will be required in chamber 14a before the arm contacts actuator 137 to effect actuation of the switch.

Operation of the embodiment shown in Figures 6 through 9 will readily be understood from the description of operation of the previously disclosed embodiment. In the instant embodiment, fluid pressure in chamber 14a (when such pressure exceeds atmospheric pressure, of course) will flex disk 16a in the same manner as disk 16. Disk 16a will tend to rock about the pivot provided by the inner edge of surface 38 of housing portion 12a in the same manner as disk 16 rocks about O ring 18. As disk 16a flexes to the right (in the position of parts viewed) to a dished configuration, the free end of arm 19a will be shifted to the right to thereby effect actuation of switch 37. It will readily be apparent that arm 19a amplifies the movement of disk 16a in the same manner as arm 19 amplifies the movement of disk 16.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A fluid pressure responsive device comprising a disk member whose opposite sides are adapted to be exposed to differential fluid pressure and which is adapted to be flexed by virtue of such differential fluid pressure, and means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto.

2. A fluid pressure responsive device comprising a disk member whose opposite sides are adapted to be exposed to differential fluid pressure and which is adapted to be flexed by virtue of such differential fluid pressure, and means engaged with one side of said disk member adjacent its periphery and providing a fulcrum over which said disk member flexes toward and away from a dished configuration, said disk member having a structurally integral, radially extending portion which projects beyond said means and whose free end moves with said disk member during flexure thereof but at an amplified rate with respect thereto.

3. A fluid pressure responsive device comprising a disk member having a central axis normal to its opposite sides and which opposite sides are adapted to be exposed to differential fluid pressure, and means engaged with one side of said disk member adjacent its periphery and providing a fulcrum over which said disk member flexes toward and away from a dished configuration, said disk member having an elongated arm one end of which extends transversely of said disk axis and whose free end moves with said disk member during flexure thereof but at an amplified rate with respect thereto as a result of its elongation.

4. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, and an annular sealing member engaged with the other side of said disk member adjacent its periphery to prevent communication between the respective fluid pressures on opposite sides of said disk member.

5. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, and means adapted to be actuated by movement of said arm during flexure of said disk member.

6. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an elongated arm one end of which is structurally integral with said disk member and whose free end moves with said disk member during flexure thereof but at an amplified rate with respect thereto as a result of its elongation, an annular sealing member engaged with the other side of said disk member adjacent its periphery to prevent communication between respective fluid pressures on opposite sides of said disk member, and means adapted to be actuated by movement of said arm during flexure of said disk member.

7. A fluid pressure responsive device comprising a disk member whose opposite sides are adapted to be exposed to a differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereof, an annular sealing member engaged with the other side of said disk member adjacent its periphery to prevent communication between respective fluid pressures on opposite sides of said disk member, means adapted to be actuated upon movement of said arm during flexure of said disk member, and means for adjusting said device to provide for actuation of said means at various differential fluid pressures.

8. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, an annular sealing member engaged with the other side of said disk member adjacent its periphery to prevent communication between respective fluid pressures on opposite sides of said disk member, means adapted to be actuated upon movement of said arm to a predetermined position during flexure of said disk member, and means for adjusting said device to effect actuation of said means at various positions of said arm to thereby cause actuation of said means at various differential fluid pressures.

9. A fluid pressure responsive device comprising a housing in part defining a fluid chamber, a disk member whose opposite sides are adapted to be exposed to differential fluid pressure and which is adapted to be flexed by virtue of such differential fluid pressure, said disk member being peripherally secured to said housing for flexure in a flatwise direction whereby one side thereof in part defines said chamber and is exposed to the fluid pressure therein and said disk member having a structurally integral portion disposed exteriorly of said chamber which provides an arm whose free end moves with said disk member during flexure thereof but at an amplified rate with respect thereto, and means adapted to be actuated by movement of said arm during flexure of said disk member.

10. A fluid pressure responsive device comprising a housing in part defining a pair of chambers adapted to contain differential fluid pressures, a disk member whose opposite sides are adapted to be exposed to differential fluid pressure and which is adapted to be flexed by virtue of such differential fluid pressure, said disk member being peripherally secured to said housing for flexure in a flatwise direction whereby respective sides thereof in part define respective chambers and are exposed to the fluid pressures therein and said disk member having a structurally integral portion disposed exteriorly of said chambers which provides an arm whose free end moves with said disk member during flexure thereof, and means adapted to be actuated by movement of said arm during flexure of said disk member.

11. A fluid pressure responsive device comprising a housing in part defining a fluid chamber, a disk member whose opposite sides are adapted to be exposed to differential fluid pressure and which is adapted to be flexed by virtue of such differential fluid pressure, said disk member being carried by said housing whereby one of its sides in part defines said chamber and is exposed to the fluid pressure therein and said disk member having a structurally integral portion disposed exteriorly of said chamber which provides an arm whose free end moves with said disk member during flexure thereof, means carried by said housing engaged with one side of said disk member adjacent its periphery and providing a fulcrum over which said disk member flexes toward and away from dished configuration, an annular sealing member engaged with the other side of said disk member adjacent its periphery to prevent communication between respective fluid pressures on opposite sides of said disk member, and means adapted to be actuated by movement of said arm during flexure of said disk member.

12. A fluid pressure responsive device comprising a housing in part defining a fluid chamber, a relatively thick metallic disk member whose opposite sides are adapted to be exposed to differential fluid pressure and which is adapted to be flexed slightly by virtue of such differential fluid pressure, said disk member being carried by said housing whereby one of its sides in part defines said chamber and is exposed to the fluid pressure therein and said disk member having a structurally integral portion disposed exteriorly of said chamber which provides an elongated arm whose free end moves with said disk member during flexure thereof but at an amplified rate with respect thereto as a result of its elongation, means carried by said housing engaged with one side of said disk member adjacent its periphery and providing a fulcrum over which said disk member flexes toward and away from a dished configuration, an annular sealing member engaged with the other side of said disk member adjacent its periphery to prevent communication between respective fluid pressures on opposite sides of said disk member, and means adapted to be actuated by the amplified movement of said arm during flexure of said disk member.

13. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, abutment means carried by and extending transversely of said arm and adjustable toward and away therefrom, and means engageable with said abutment means and actuated thereby during movement of said arm upon flexure of said member, said means being actuated by said abutment means at various differential pressures depending upon the latter's position of adjustment relative to said arm.

14. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, abutment means extending transversely of said arm and having threaded connection therewith and adjustable toward and away therefrom by means of such connection, means in part provided by said arm and in part provided by said abutment means to locate the latter at various positions of adjustment relative to said arm and to releasably maintain said abutment means at various respective said positions, said means comprising a member receivable within any one of a plurality of recesses and yieldably urged to seated relation therein, and means engageable with said abutment means and actuated thereby during movement of said arm upon flexure of said member, said means being actuated by said abutment means at various differential pressures depending upon the latter's position of adjustment relative to said arm.

15. A fluid pressure responsive device comprising a disk member whose opposite sides are adapted to be exposed to differential fluid pressure and which is adapted to be flexed by virtue of such differential fluid pressure, means engaged with one side of said disk member adjacent its periphery and providing a fulcrum over which said disk member flexes toward and away from a dished configuration, said disk member having an arm one end of which is structurally integral with said disk member and whose free end moves with said disk member during flexure thereof but at an amplified rate with respect thereto, a threaded stud carried by and extending transversely of the free end of said arm, abutment means threaded upon said stud and adjustable therealong toward and away from said arm and having a plurality of recesses adjacent the latter, a plunger shiftably carried by the free end of said arm adjacent said stud and yieldably biased to seated relation within any one of said recesses to locate said abutment means at various positions of adjustment along said stud and to releasably maintain said abutment means at respective said positions, and means engageable with said abutment means and actuated thereby during movement of said arm upon flexure of said member, said means being actuated by said abutment means at various differential pressures depending upon the latter's position of adjustment along said stud.

16. The construction of claim 9 wherein said means is shiftable transversely of said arm to provide for its actuation at various differential fluid pressures and wherein said means is shiftable longitudinally of said arm to vary the effective length of the latter and thus vary the sensitivity of said means to changes in differential fluid pressure.

17. The construction, according to claim 5 wherein said disk member is circular and said arm extends radially outwardly thereof, and wherein a pair of O-ring seals, one of which is said first named means, respectively engage opposite sides of said disk member at the periphery thereof, each of said seals comprising a fulcrum over which said disk member may flex.

References Cited in the file of this patent

UNITED STATES PATENTS

| | | |
|---|---|---|
| 2,382,289 | Burt | Aug. 14, 1945 |
| 2,528,756 | Kaser | Nov. 7, 1950 |
| 2,751,530 | Armstrong | June 19, 1956 |